United States Patent
Guo et al.

(10) Patent No.: US 9,935,535 B2
(45) Date of Patent: Apr. 3, 2018

(54) FLAT LINEAR VIBRATION MOTOR

(71) Applicants: Shun Guo, Shenzhen (CN); Hongxing Wang, Shenzhen (CN); Lubin Mao, Shenzhen (CN)

(72) Inventors: Shun Guo, Shenzhen (CN); Hongxing Wang, Shenzhen (CN); Lubin Mao, Shenzhen (CN)

(73) Assignee: AAC TECHNOLOGIES PTE. LTD., Singapore (CN)

( * ) Notice: Subject to any disclaimer, the term of this patent is extended or adjusted under 35 U.S.C. 154(b) by 345 days.

(21) Appl. No.: 14/984,381

(22) Filed: Dec. 30, 2015

(65) Prior Publication Data

US 2016/0226359 A1    Aug. 4, 2016

(30) Foreign Application Priority Data

Feb. 2, 2015 (CN) .......................... 2015 1 0053644

(51) Int. Cl.
   *H02K 33/16*    (2006.01)
(52) U.S. Cl.
   CPC ..................... *H02K 33/16* (2013.01)
(58) Field of Classification Search
   CPC ...................................................... H02K 33/16
   USPC ..................................... 310/12.02–12.15, 36
   See application file for complete search history.

(56) References Cited

U.S. PATENT DOCUMENTS

| | | | |
|---|---|---|---|
| 6,239,517 B1* | 5/2001 | Nakamura | B41J 25/006 101/93.04 |
| 7,449,803 B2* | 11/2008 | Sahyoun | H02K 33/16 310/14 |
| 7,768,160 B1* | 8/2010 | Sahyoun | H02K 33/16 310/14 |
| 8,624,450 B2* | 1/2014 | Dong | H02K 33/16 310/15 |
| 8,682,396 B2* | 3/2014 | Yang | B06B 1/045 310/12.04 |
| 9,325,230 B2* | 4/2016 | Yamada | H02K 33/16 |
| 9,467,035 B2* | 10/2016 | Endo | B06B 1/045 |
| 2002/0018195 A1* | 2/2002 | Iwamoto | G03F 7/70691 355/72 |
| 2011/0018364 A1* | 1/2011 | Kim | H02K 33/18 310/17 |

\* cited by examiner

*Primary Examiner* — Alexander Talpalatski
(74) *Attorney, Agent, or Firm* — Na Xu; IPro, PLLC

(57) ABSTRACT

A flat linear vibration motor is disclosed. The flat linear vibration motor includes a housing having an accommodation space; a first magnet received in the accommodation space and fixed in the housing; and a vibrator unit suspended in the housing. The vibrator unit includes a clump weight, a third magnet, a driving magnet, and a fourth magnet; a second magnet fixed in the housing, the first magnet, the vibrator unit and the second magnet arranged one by one along a vibration direction of the vibrator unit; engaging assemblies suspending the vibrator unit inside the housing and driving the vibrator unit to move along the vibration direction; wherein the flat linear vibration motor further includes a ring driving coil received in the accommodation space, the ring driving coil being spaced from and surrounding the driving magnet.

9 Claims, 3 Drawing Sheets

FLAT LINEAR VIBRATION MOTOR

FIELD OF THE INVENTION

This invention relates to a type of vibration motor, especially a type of flat linear vibration motor which is used for those portable consumption electronic products.

DESCRIPTION OF RELATED ART

With the development of electronic technology, portable consumption electronic products become more and more popular, such as cellphones, handheld game player, navigation device, or handheld multimedia recreation equipment, etc., vibration motor is usually used on these electronic products to make system feedback, such as cellphones call reminders, SMS tips, navigation tips, and vibration feedback of game players, etc. Such wide application requires that the vibration motor must be of high performance and long service life.

The vibration motor of related technology includes a housing, a vibrator unit received in the housing and a spring unit used to suspend the vibrator unit within the housing and provide restoring force and localization guidance to the vibrator unit. But the vibrator unit of the vibration motor with this kind of structure shakes easily and spring will be failed and worn elastically due to long-term use, so the performance and service life of motor will be influenced. In addition, the driving coils of the vibration motor with this kind of structure are provided on one side face of vibrator unit. This kind of assembly mode makes the insufficient electromagnetic driver force generated by driving coil.

Therefore, it is necessary to provide a new flat linear vibration motor to solve the problems mentioned above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. It should be understood the specific embodiments described hereby is only to explain this disclosure, not intended to limit this disclosure.

Figure 1:
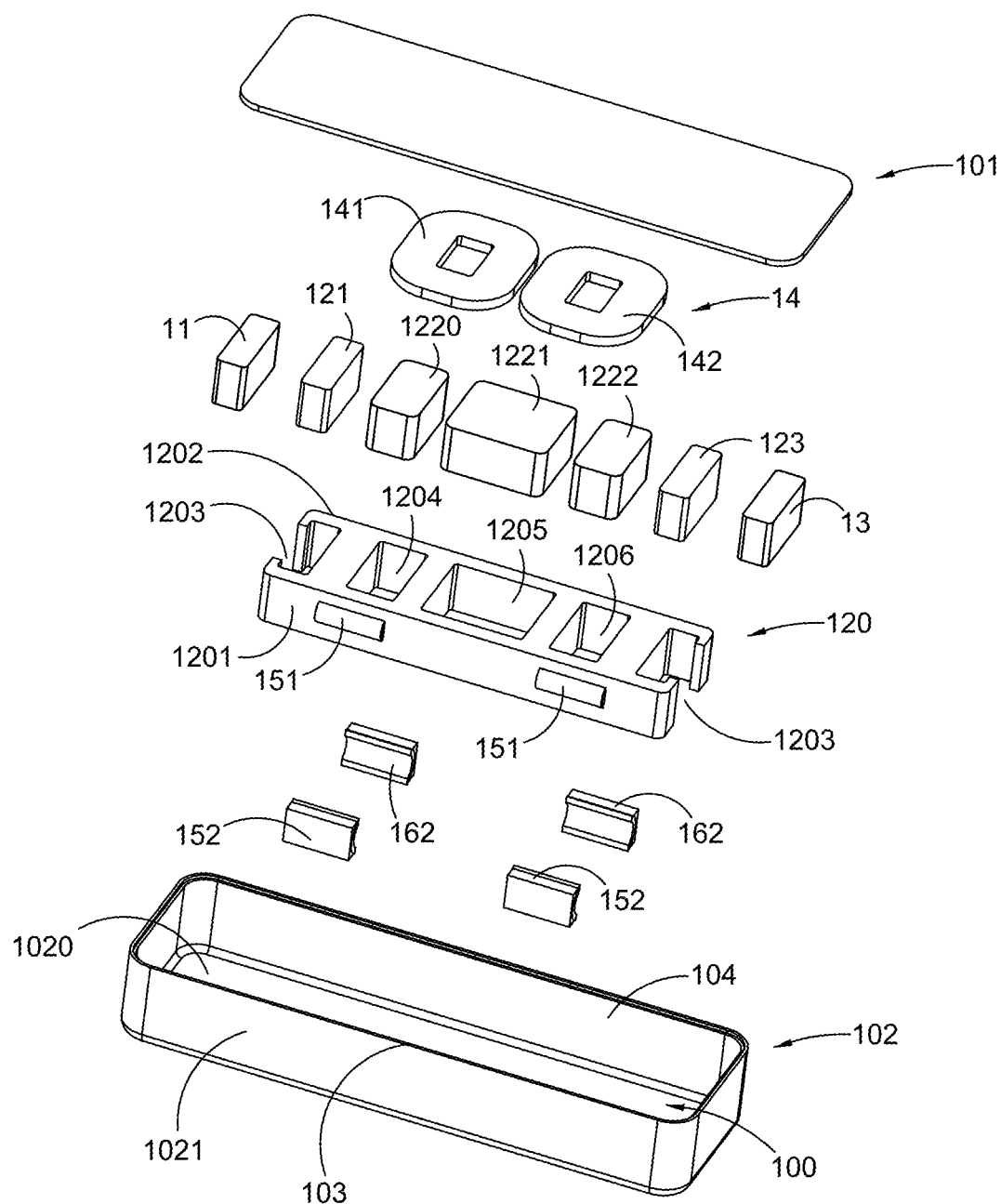
FIG. 1 is an isometric and exploded view of a flat linear vibration motor in accordance with a first exemplary embodiment of the present disclosure.
Figure 2:
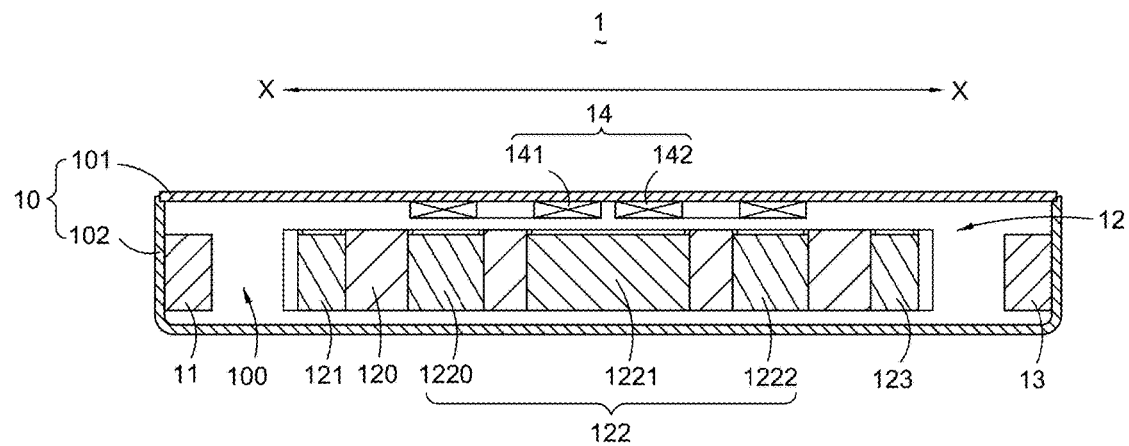
FIG. 2 is a cross-sectional view of the flat linear vibration motor in FIG. 1 taken along a longer axis thereof.
Figure 3:
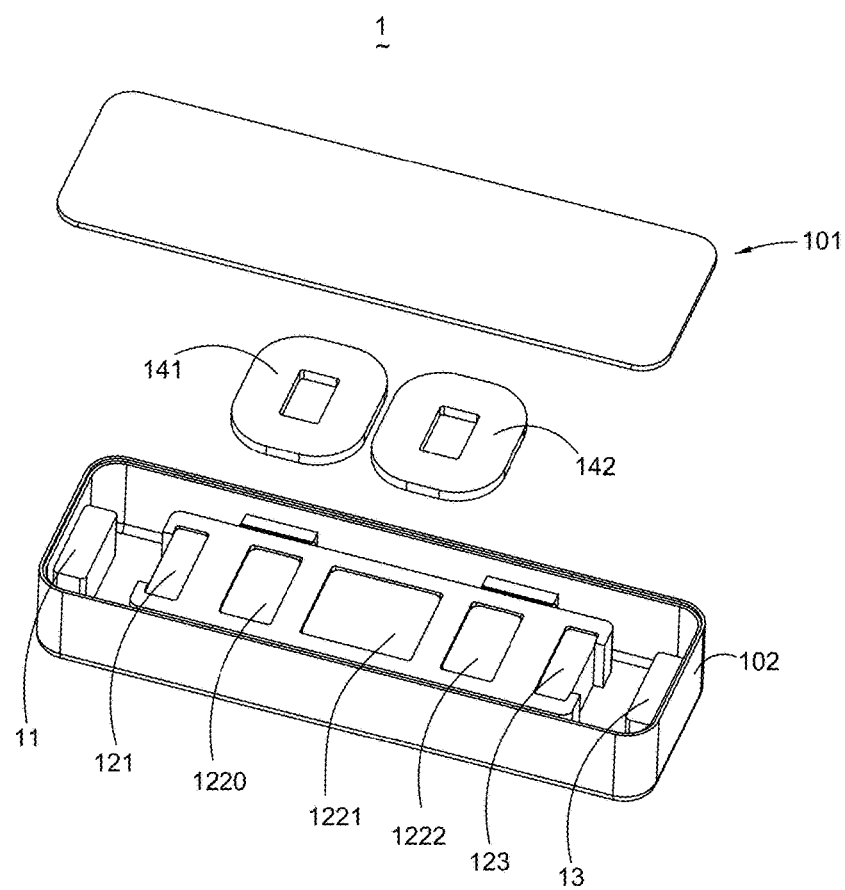
FIG. 3 is a partial assembled view of the flat linear vibration motor shown in FIG. 1.

As shown in FIGS. 1-3, a flat linear vibration motor 1 in accordance with an exemplary embodiment of the present disclosure includes a housing 10 forming an accommodation space 100, a first magnet 11 received in the accommodation space 100 and fixed in the housing 10, a vibrator unit 12 suspended in the housing 10 and a second magnet 13 fixed in the housing 10. The first magnet 11, the vibrator unit 12 and the second magnet 13 are arranged one by one along a vibration direction X-X of the vibrator unit 12.

The housing 10 includes an upper shell 101 and a lower shell 102 cooperating with the upper shell 101 to form the accommodation space 100. The lower shell 102 includes a bottom wall 1020 and a side wall 1021 extending from the bottom wall 1020. The first magnet 11 and the second magnet 13 are fixed respectively in the side wall 1021 of the lower shell 102 and disposed in an inner side face of the side wall 1021. The upper shell 101 can be plate-shaped and the same shape as that of following lower shell 102. Various shapes can be set according to concrete need.

Figure 4:
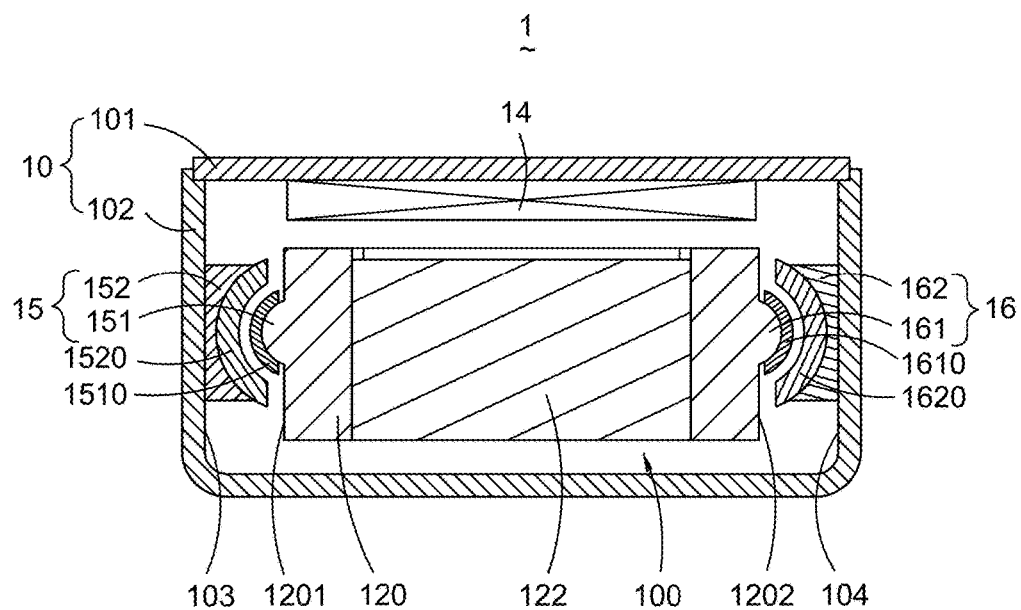
FIG. 4 is a cross-sectional view of the flat linear vibration motor shown in FIG. 1 taken along a shorter axis.

Referring also to FIG. 4, the vibration motor 1 includes engaging assemblies 15, 16 provided between the vibrator unit 12 and the housing 10 for suspending the vibrator unit inside the housing 10 to make the vibrator unit 12 to move along the vibration direction X-X. The engaging assemblies 15, 16 include guide groove parts 152, 162 having magnetic guide grooves 1520, 1620, and guide rail parts 151, 161 having magnetic guide rails 1510, 1610. The magnetic guide rails 1510, 1610 are at least partially wrapped by the magnetic guide grooves 1520, 1620. The same magnetic poles of the magnetic guide rails and the magnetic guide grooves are configured to face to face for suspending the vibrator unit 12 within the housing 10.

The vibrator unit 12 includes a long-strip clump weight 120, a third magnet 121, a driving magnet 122 and a fourth magnet 123 fixed in the clump weight 120. The third magnet 121 is such configured that a magnetic pole thereof is opposed to an adjacent magnetic pole of the first magnet. The fourth magnet 123 is such configured that a magnetic pole thereof is opposed to an adjacent magnetic pole of the second magnet 13. By utilizing the repelling force generated between the first magnet 11 and the third magnet 121 and the repelling force generated between the second magnet 13 and the fourth magnet 123, the first magnet 11 and the second magnet 13 can limit the displacement of the vibrator unit 12 on the vibration direction X-X of the vibrator unit and provide restoring force to the vibrator unit 12.

The clump weight 120 includes a first outer side face 1201 and a second outer side face 1202 extending along the vibration direction X-X of the vibrator unit 12. Optionally, the first outer side face 1201 is parallel to the second outer side face 1202. The housing includes a first inner side face 103 and a second inner side face 104 extending along the direction of vibration X-X of vibrator unit. Similarly, the first inner side face 103 and the second inner side face 104 are set mutually parallel in the embodiment. The engaging assemblies 15 and 16 include a first engaging assembly 15 located between the first outer side face 1201 and the first inner side face 103 and a second engaging assembly 16 located between the second side face 1202 and the second inner side face 104.

The first engaging assembly includes a first guide rail part 151 fixed on the first outer side face 1201 and forming a first magnetic guide rail 1510, and a first guide groove part 152 fixed on the first inner side surface 103 and forming a first magnetic guide groove 1510, the first guide rail part being cooperating with the first guide groove part. the second engaging assembly includes a second guide rail part 161 fixed on the second outer side face 1202 and forming a second magnetic guide rail 1610, and a second guide groove part 162 fixed on the second inner side surface 104 and forming a second magnetic guide groove 1620, the first guide rail part being cooperating with the first guide groove part. It cooperates with the first guide groove part 152 through the first guide rail part 151 and the guide rail 1510 and 1610 and guide groove 1520 and 1620 of the second guide groove part through the second guide rail part 161 to realize that the vibrator unit 12 is suspended inside the housing 10 and move along the vibration direction X-X of the vibrator unit 12.

Referring back to FIGS. 1-2, the driving magnet 122 is magnetized along a thickness direction thereof, and the driving coil 14 is received in the accommodation space 100 and spaced apart from the driving magnet 122. After being powered on, the driving coil 14 in the magnetic field driven by the driven magnet 122 is affected by the action of Ampere force. After the driving magnet 122 is affected by the counter force of Ampere force, the vibrator unit 12 is promoted to vibrate repeatedly along the vibration direction X-X.

The driving magnet 122 includes, arranged along the vibration direction, a fifth magnet 1220, a sixth magnet 1221 and a seventh magnet 1222. A magnetization direction of the fifth magnet 1220 is same to a magnetization direction of the seventh magnet 1222, while a magnetization direction of the sixth magnet 122a is reverse to a magnetization direction of the seventh magnet 1222. The driving coil 14 includes a first driving coil 141 located above the fifth and sixth magnets 1220, 1221, and a second driving coil 142 located above the sixth and seventh magnets 1221, 1222.

The clump weight 120 provides slots 1203 along two ends of the vibrator unit 12 along the vibration direction X-X. Corresponding to the fifth magnet 1220, the sixth magnet 1221 and the seventh magnet 1222, the clump weight 120 further includes a first through hole 1204, a second through hole 1205, and a third through hole 1206.

Figure 5:
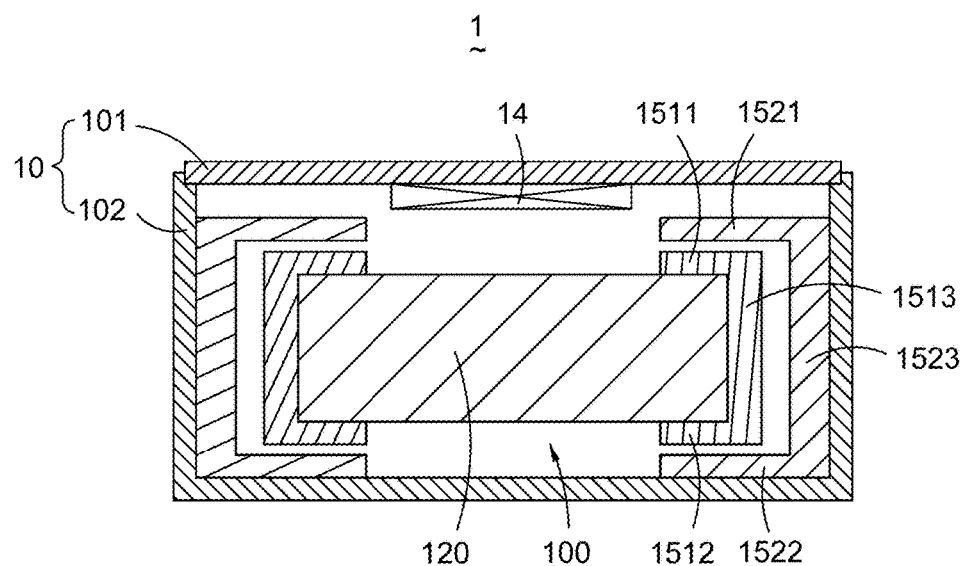
FIG. 5 is a cross-sectional view of a flat linear vibration motor in accordance with a second exemplary embodiment of the present disclosure, taken along a shorter axis.

Referring to FIG. 5, the guide rail part includes a first guide rail magnet 1511 attached to an upper surface of the clump weight 120, a second guide rail magnet 1512 attached to a lower surface of the clump weight 120, and a third guide rail magnet 1513 attached to a side surface of the clump weight 120. Correspondingly, the guide groove part includes a first groove magnet 1521 located above the first guide rail magnet 1512 and having a magnetic pole facing a same magnetic pole of the first guide rail magnet 1512, a second guide groove magnet 1522 located below the second guide rail magnet 1512 and having a magnetic pole facing a same magnetic pole of the second guide rail magnet 1512, and a third guide groove magnet 1513 located on the housing 10 and having a magnetic pole thereof facing a same magnetic pole of the third guide rail magnet 1513.

The flat linear vibration motor 1 provided by the invention utilizes the restoring force provided by the repelling force between magnet and utilizes prismatic pair to provide localization guidance for vibrator of unit 12 and set the driving coil 14 as ring and set circularly in periphery of driven magnet 122 to improve the utilization of magnet to avoid the effect on performance of motor and service life due to the failure or wear of spring parts of traditional vibration motor to promote the performance of vibration motor 1 efficiently.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A flat linear vibration motor, including:
    a housing having an accommodation space;
    a first magnet received in the accommodation space and fixed in the housing;
    a vibrator unit suspended in the housing, the vibrator unit including a clump weight, a third magnet, a driving magnet, and a fourth magnet, the third magnet being such configured that a magnetic pole thereof is opposite to an adjacent magnetic pole of the first magnet;
    a second magnet fixed in the housing, the first magnet, the vibrator unit and the second magnet arranged one by one along a vibration direction of the vibrator unit; the second magnet being such configured that a magnetic pole thereof is opposite to an adjacent magnetic pole of the fourth magnet;
    engaging assemblies suspending the vibrator unit inside the housing and driving the vibrator unit to move along the vibration direction, the engaging assemblies including guide groove parts having magnetic guide grooves, and guide rail parts having magnetic guide rails which are at least partially wrapped by the magnetic guide grooves, same magnetic poles of the magnetic guide rails and the magnetic guide grooves being configured to face to face for suspending the magnetic guide rails in the magnetic guide grooves; and
    a driving coil received in the accommodation space, the driving coil being spaced from and surrounding the driving magnet.

2. The flat linear vibration motor as described in claim 1, wherein the housing includes an upper shell and a lower shell cooperating with the upper shell for forming the accommodation space, the lower shell includes a bottom wall and a side wall extending from the bottom wall, the first magnet and the second magnet are fixed respectively on the side wall of the lower shell.

3. The flat linear vibration motor as described in claim 1, wherein the clump weight includes a first outer side face and a second outer side face opposed to the first outer side face, the housing includes a first inner side wall and a second inner side wall, the engaging assemblies includes a first engaging assembly located between the first outer side face and the first inner side face, and a second engaging assembly located between the second outer side face and the second inner side face.

4. The flat linear vibration motor as described in claim 3, wherein the first outer side face and the second outer side face extend along the vibration direction of the vibrator unit, the first inner side wall and the second inner side wall extend along the vibration direction of the vibrator unit.

5. The flat linear vibration motor as described in claim 3, wherein:
    the first engaging assembly includes a first guide rail part fixed on the first outer side face and forming a first magnetic guide rail, and a first guide groove part fixed on the first inner side surface and forming a first magnetic guide groove, the first guide rail part being cooperating with the first guide groove part;
    the second engaging assembly includes a second guide rail part fixed on the second outer side face and forming a second magnetic guide rail, and a second guide groove part fixed on the second inner side surface and forming a second magnetic guide groove, the first guide rail part being cooperating with the first guide groove part; and by virtue of the cooperation between the guide rails and the guide grooves, the vibrator unit is suspended in the housing and moveable along the vibration direction.

6. The flat linear vibration motor as described in claim 1, wherein the guide rail part includes a first guide rail magnet attached to an upper surface of the clump weight, a second guide rail magnet attached to a lower surface of the clump weight, and a third guide rail magnet attached to a side surface of the clump weight, correspondingly, the guide groove part includes a first groove magnet located above the first guide rail magnet and having a magnetic pole facing a same magnetic pole of the first guide rail magnet, a second guide groove magnet located below the second guide rail magnet and having a magnetic pole facing a same magnetic pole of the second guide rail magnet, and a third guide groove magnet located on the housing and having a magnetic pole thereof facing a same magnetic pole of the third guide rail magnet.

7. The flat linear vibration motor as described in claim 1, wherein slots are provided at two opposed ends of the clump weight for respectively receiving the third and fourth magnets.

8. The flat linear vibration motor as described in claim 1, wherein the driving magnet includes, arranged along the vibration direction, a fifth magnet, a sixth magnet and a seventh magnet, correspondingly, the clump weight further includes a first through hole, a second through hole, and a third through hole for respectively receiving the fifth magnet, the sixth magnet and the seventh magnet.

9. The flat linear vibration motor as described in claim 8, wherein a magnetization direction of the fifth magnet is same to a magnetization direction of the seventh magnet, while a magnetization direction of the sixth magnet is reverse to a magnetization direction of the seventh magnet; the driving coil includes a first driving coil located above the fifth and sixth magnets, and a second driving coil located above the sixth and seventh magnets.

\* \* \* \* \*